(12) United States Patent  
Zhu

(10) Patent No.: US 9,242,323 B2  
(45) Date of Patent: Jan. 26, 2016

(54) DIE PRESSING PLATE

(75) Inventor: Huafeng Zhu, Ningbo (CN)

(73) Assignee: Ningbo Yinzhou Zhonghe Hualida Plastic Mould Factory, Ningbo (CN)

( * ) Notice: Subject to any disclaimer, the term of this patent is extended or adjusted under 35 U.S.C. 154(b) by 150 days.

(21) Appl. No.: 14/342,742

(22) PCT Filed: Jul. 12, 2012

(86) PCT No.: PCT/CN2012/000949  
§ 371 (c)(1),  
(2), (4) Date: Mar. 4, 2014

(87) PCT Pub. No.: WO2013/033967  
PCT Pub. Date: Mar. 14, 2013

(65) Prior Publication Data  
US 2014/0210151 A1 Jul. 31, 2014

(30) Foreign Application Priority Data

Sep. 7, 2011 (CN) .......................... 2011 1 0272103

(51) Int. Cl.
| | |
|---|---|
| *B23Q 3/02* | (2006.01) |
| *B23Q 3/06* | (2006.01) |
| *B25B 5/10* | (2006.01) |
| *B21D 37/00* | (2006.01) |

(52) U.S. Cl.  
CPC *B23Q 3/06* (2013.01); *B21D 37/00* (2013.01); *B25B 5/105* (2013.01)

(58) Field of Classification Search  
USPC ........................................................ 269/101  
See application file for complete search history.

(56) References Cited

U.S. PATENT DOCUMENTS

| | | | | |
|---|---|---|---|---|
| 1,346,504 | A * | 7/1920 | Olai ....................... | B25B 5/105 |
| | | | | 144/278.1 |
| 1,676,289 | A * | 7/1928 | Schmalz ................. | B25B 5/105 |
| | | | | 269/210 |
| 2,325,387 | A * | 7/1943 | Fredrickson ........... | B25B 5/105 |
| | | | | 269/258 |
| 2,672,790 | A * | 3/1954 | Carroll ................... | B25B 5/105 |
| | | | | 24/517 |
| 3,227,438 | A * | 1/1966 | Sequin ................... | B25B 5/105 |
| | | | | 269/239 |
| 3,436,072 | A * | 4/1969 | Svenson ................. | B25B 5/105 |
| | | | | 269/94 |

(Continued)

FOREIGN PATENT DOCUMENTS

| | | | | | |
|---|---|---|---|---|---|
| CH | | 160502 A | * | 3/1933 | .............. B25B 5/105 |
| DE | | 9207874 U1 | * | 9/1992 | .............. B25B 5/105 |

(Continued)

*Primary Examiner* — Lee D Wilson  
*Assistant Examiner* — Alvin Grant  
(74) *Attorney, Agent, or Firm* — Wang Law Firm, Inc.; Li K. Wang; Stephen Hsu

(57) ABSTRACT

A die pressing plate including a main body, an adjusting groove, and a main through hole, each of the left or right surface of the main through hole has at least one guiding groove; a lower cushion block having a top curve surface; and an upper cushion block having a lower curve surface for engaging the top curve surface of the lower cushion block, at least one extension portion protruding away from the lower curve surface, the at least one extension portion having two blocking portions, the blocking portions of the at least one extension portion engage the at least one guiding groove, the at least one extension portion extends elastically when the blocking portion slide downwardly, and the blocking portion is blocked by the bottom surface of the main body. The die pressing plate is simple in structure, fast and convenient to assemble and use, and low in cost.

8 Claims, 4 Drawing Sheets

(56) References Cited

U.S. PATENT DOCUMENTS

| | | | | |
|---|---|---|---|---|
| 4,981,289 | A | * | 1/1991 | Duval .................... B25B 5/105 269/94 |
| D322,259 | S | * | 12/1991 | Quandt ........................ D15/135 |
| 8,459,624 | B2 | * | 6/2013 | Klippel .................. B25B 5/105 238/349 |
| 2009/0101389 | A1 | * | 4/2009 | Chirumbolo ....... H01R 13/5812 174/135 |

FOREIGN PATENT DOCUMENTS

| | | | | |
|---|---|---|---|---|
| DE | 19932037 | C1 * | 1/2001 | .............. B25B 5/105 |
| DE | 102013215385 | A1 * | 2/2015 | .............. B25B 5/105 |
| EP | 0781625 | A1 * | 7/1997 | .............. B21D 37/20 |
| FR | 2469243 | A1 * | 5/1981 | .............. B25B 5/105 |
| GB | 1425626 | A * | 2/1976 | .............. B21D 37/00 |

* cited by examiner

DIE PRESSING PLATE

RELATE APPLICATIONS

This application is a national phase entrance of and claims benefit to PCT Application for Die Pressing Plate thereof, PCT/CN2012/000949, filed on Jul. 12, 2012, which claims benefit to Chinese Patent Application 201110272103.X, filed on Sep. 7, 2011. The specifications of both applications are incorporated here by this reference.

FIELD OF THE INVENTION

The present invention relates to a die pressing plate.

DESCRIPTION OF THE PRIOR ART

Die pressing plates are common fixtures in the mechanical processing industry. The traditional flat die pressing plates, due to causes, for example, the cushion blocks of which are likely to fall down and lose, have been gradually replaced by the existing die pressing plates of a variety of structures on the market.

As shown in a Chinese Utility Model CN2380344Y (Patent No. is ZL99206225.X), a convenient pressing plate group for machines comprises a pressing plate providing with an elongated slot and a screw strung with a pair of gaskets (an upper gasket and a lower gasket) for the purpose of clamping, wherein the pressing plate is arched, a row of densely distributed racks are provided on the rear side of the pressing plate along two sides of the elongated slot; the lower gasket and the pressing plate are engaged with tooth-surface, the upper gasket has a lower curve surface and the lower gasket has a top curve surface for engaging the lower curve surface of the upper gasket. Such a pressing plate group has a simple structure; by the screw, through the pair of the upper and lower gaskets in a cambered-surface fit and the tooth-surface engagement between the lower gasket and the rear side of the pressing plate, an arched pressing plate which falls aslant on a workpiece and a worktable may be clamped tightly without any cushion block; furthermore, the change of the thickness of the workpiece in a large range is allowed. Compared with the traditional flat pressing plates, this pressing plate group avoids replacing the cushion blocks along with the change of the thickness of the workpiece. However, this pressing plate group has the following shortcomings that a gusset plate is required to connect the upper and lower cushion blocks together, and fastened onto the pressing plate, resulting in more parts and inconvenient installation and connection. Moreover, the connection strength of the gusset plate is limited, resulting in inconvenient use of the pressing plate.

A Chinese patent CN201023190Y (Patent No. is ZL200720109605.X) discloses that a die pressing plate, which had made a further improvement to the prior art, for example, a hollow connector protrudes away from a bottom surface of a upper cushion block to match with an upper through hole, and the hollow connector passes through a lower through hole and a main through hole to be detachably connected to a stopper. Furthermore, the stopper may be a stop screw screwed on the side wall of a connecting sleeve, or a gasket limited on an end portion of the connecting sleeve and the outer diameter of the gasket is greater than the width of the main through hole. With the above structure, on one hand, the upper cushion block, the lower cushion block and the main body may be connected as a whole, to prevent the scattering of the components when in use. On the other hand, the die of the original connecting sleeve is omitted, resulting in lower manufacturing cost of the die pressing plate. However, the improvement still has the following shortcomings that, as the hollow connector passes through the lower through hole and the main through hole to be detachably connected to the stopper, the number of the components may be further reduced; it is easily lost; and both the assembly and the use are not so fast and convenient, thus requiring further improvements and designs.

SUMMARY OF THE INVENTION

It is an object of the present invention to provide a die pressing plate which is simple in structure, fast and convenient to assemble and use and low in cost.

For achieving this object, the die pressing plate comprises: a main body with a top surface and a bottom surface, an adjusting groove, and a main through hole formed in a center of the adjusting groove along a length of the main body, the main through hole having a left surface and a right surface, each of the left surface and the right surface has at least one guiding groove extending from the top surface to the bottom surface; a lower cushion block having a top curve surface and a lower through hole defined by the top curve surface; and an upper cushion block disposed on top of the lower cushion block, the upper cushion block having a top surface and a lower curve surface for engaging the top curve surface of the lower cushion block, an upper through hole defined on the top surface of the upper cushion block, at least one extension portion protruding away from the lower curve surface, the at least one extension portion having two blocking portions extending horizontally away from the at least one extension portion and away from each other, wherein the upper cushion block engaged with the lower cushion block is disposed in the adjusting groove, the blocking portions of the at least one extension portion engage the at least one guiding groove on each of the left surface and the right surface of the main through hole, the at least one extension portion extends elastically when the blocking portion slide downwardly through the at least one guiding groove, and the blocking portion is blocked by the bottom surface of the main body.

Preferably, there are two extension portions, protruding away from the lower curve surface of the upper cushion block, the two extension portions are located on opposite sides of the lower curve surface of the upper cushion block, and there are two guiding grooves on each of the left surface and the right surface of the main through hole.

Preferably, each guiding groove includes an upper section with a first width, a lower section with a second width, and a transition section with a guiding surface arranged between the upper section and the lower section, the first width is greater than the second width, the lower sections of the two guiding grooves on either the left surface or the right surface of the main through hole define a first distance that is greater than or smaller than a second distance defined by two blocking portions on the two extension portions.

Preferably, the two guiding grooves on either the left surface or the right surface of the main through hole are substantially arranged in inverted-V-shaped or V-shaped.

Preferably, the at least one extension portion has a bottom and two blocking portions protrude from left side and right side of the bottom of the at least one extension portion.

Preferably, the at least one extension portion has a middle part with an inner side and a recess is formed therein, the recess causes the at least one extension portion to have a small thickness in the middle part, a first port is formed at a front side of the lower cushion block and a second port is formed at a rear side of the lower cushion block, each of the first port and the second port receives one extension portion.

Preferably, the at least one extension portion has a lower part that includes a slanting portion slanted toward a center axis of the upper cushion block and a vertical bottom portion with an outer surface, and the outer surface of the vertical bottom portion is provided with an arc-shaped reinforcing rib.

Preferably, the adjusting groove has a bottom surface and the lower cushion block has a bottom surface, and both the bottom surface of the adjusting groove and the bottom surface of the lower cushion block are provided with tooth-surface for engaging each other.

Compared with the prior art, in the present invention, the extension portion extends elastically when the blocking portion slide downwardly through the guiding groove, and the blocking portion is blocked by the bottom surface of the main body, thereby omitting the design of gusset plates, requiring fewer components and no thread forming and riveting, reducing the steps of processing, bringing convenience to the production and assembly, lowering the cost, and making the overall structure rational and practical.

DETAILED DESCRIPTION OF THE PREFERRED EMBODIMENT

Figure 1:
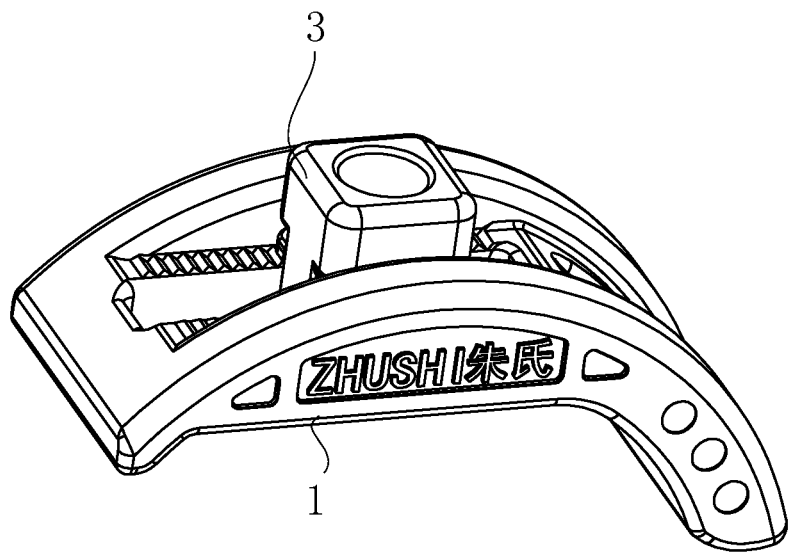
FIG. 1 is one perspective view of a die pressing plate in accordance with an embodiment of the present invention.
Figure 2:
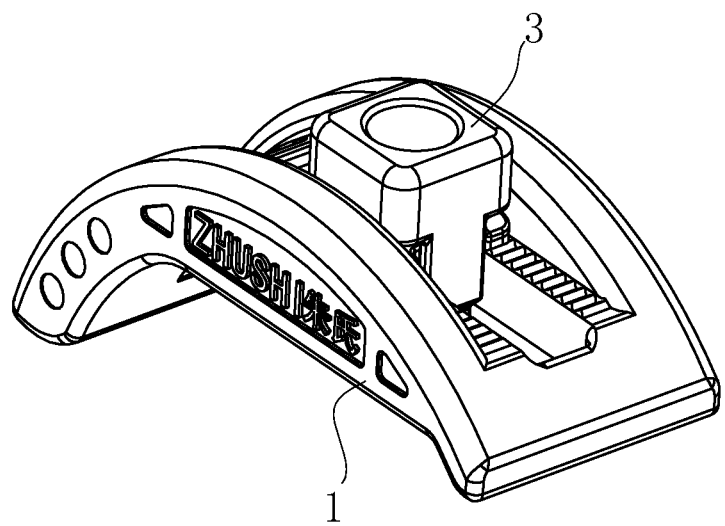
FIG. 2 is another perspective view of the die pressing plate in accordance with the embodiment of the present invention.
Figure 3:
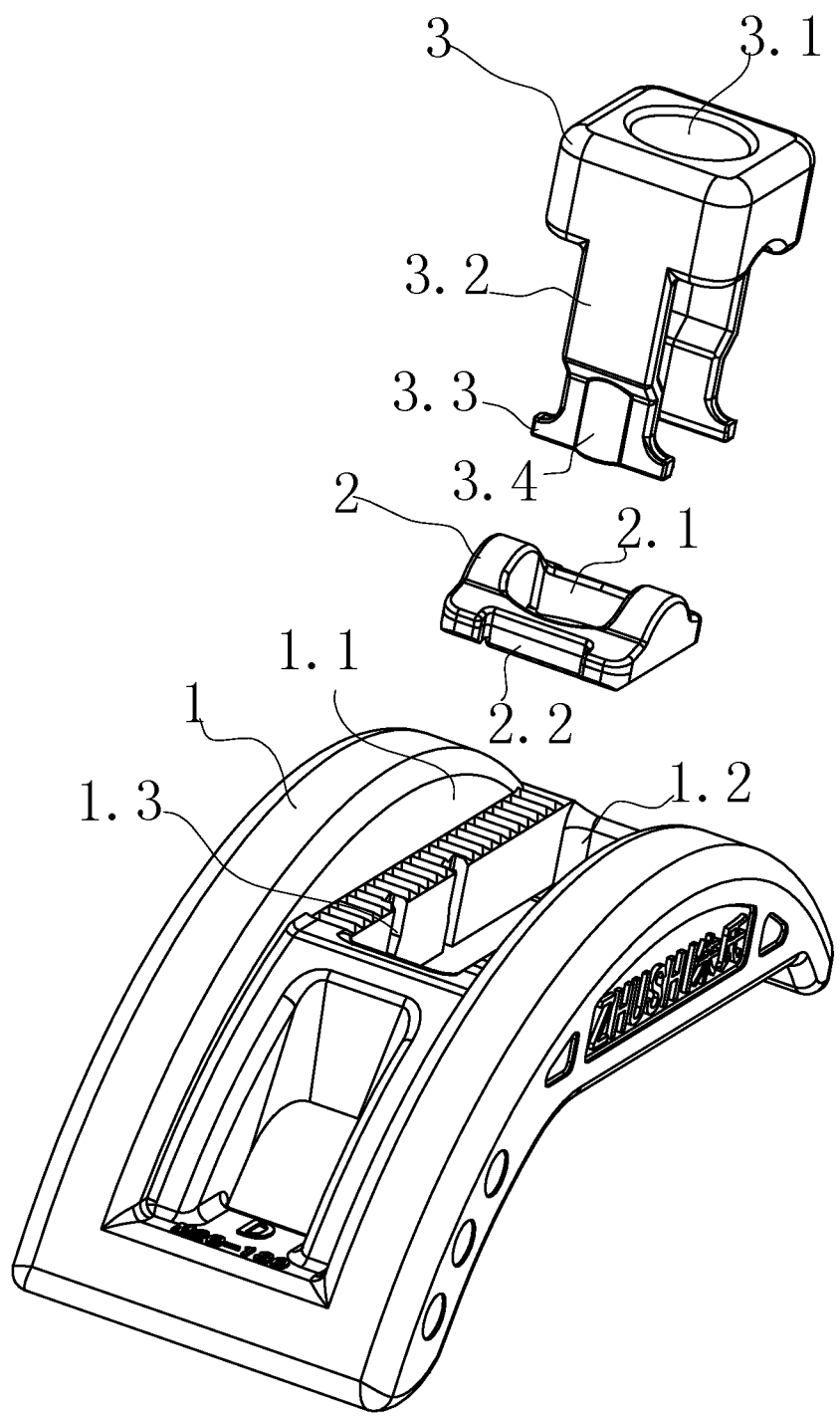
FIG. 3 is one exploded view of the die pressing plate in accordance with the embodiment of the present invention.
Figure 4:
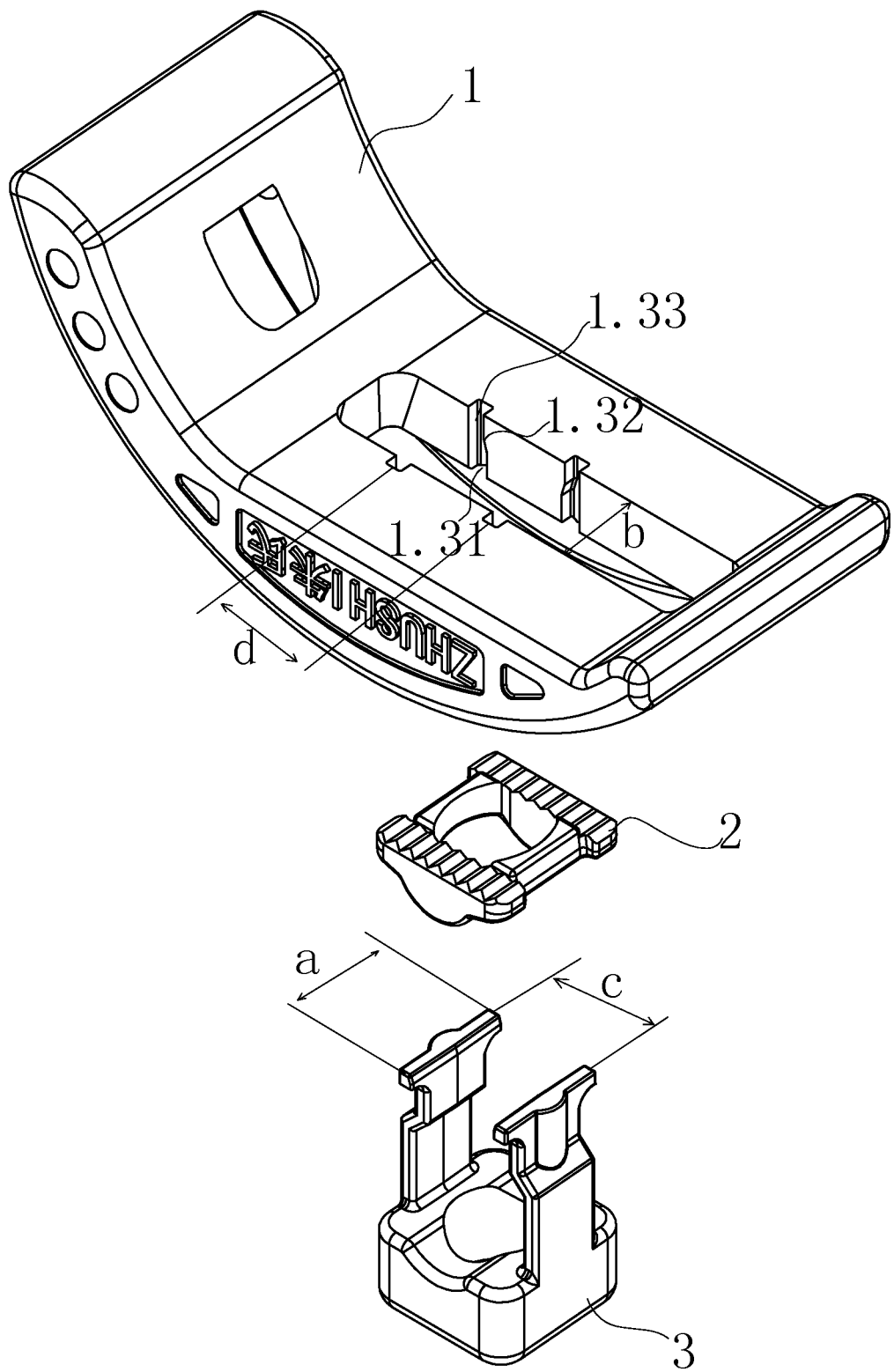
FIG. 4 is another exploded view of the die pressing plate in accordance with the embodiment of the present invention.
Figure 5:
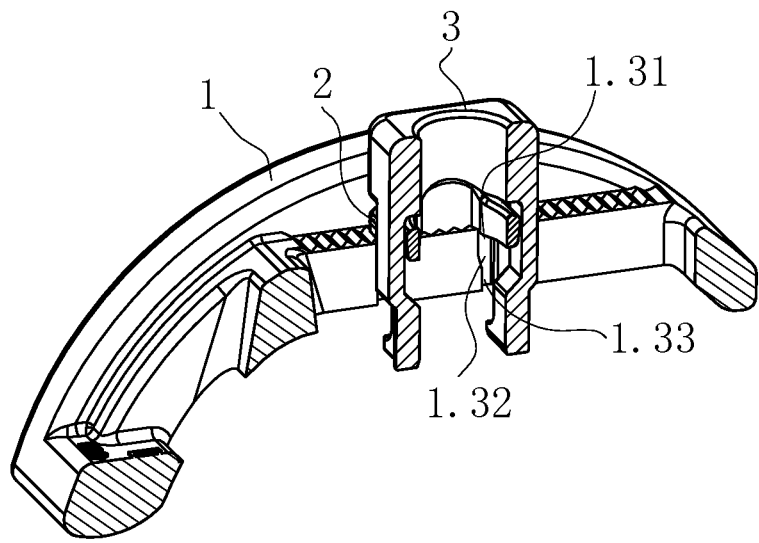
FIG. 5 is one partial cutaway view of the die pressing plate in accordance with the embodiment of the present invention.
Figure 6:
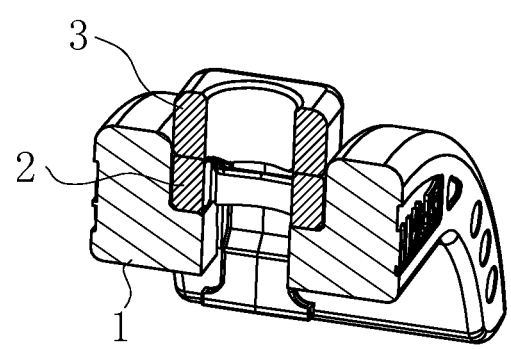
FIG. 6 is another partial cutaway view of the die pressing plate in accordance with the embodiment of the present invention.

To enable a further understanding of the innovative and technological content of the invention herein, refer to the detailed description of the invention and the accompanying drawings below:

As shown in FIG. 1 to FIG. 6, a die pressing plate comprises: a main body 1 with a top surface and a bottom surface, an adjusting groove 1.1, and a main through hole 1.2 formed in a center of the adjusting groove 1.1 along a length of the main body 1; a lower cushion block 2 having a top curve surface and a lower through hole 2.1 for the screw to pass through defined by the top curve surface; and an upper cushion block 3 disposed on top of the lower cushion block 2, the upper cushion block 3 having a top surface and a lower curve surface for engaging the top curve surface of the lower cushion block 2, an upper through hole 3.1 defined on the top surface of the upper cushion block 3 for the screw to pass through, the upper cushion block 3 engaged with the lower cushion block 2 is disposed in the adjusting groove 1.1. The above structures are similar to those of the die pressing plate in the Description of the Prior Art, thus detailed description thereto will not be repeated here.

The key points of the present invention are as follows: two extension portions 3.2 protrudes away from the lower curve surface, each extension portion 3.2 has two blocking portions 3.3 extending horizontally away from the extension portion 3.2 and away from each other, and a middle part with an inner side and a recess is formed therein, the recess causes the extension portion 3.2 to have a small thickness in the middle part, each extension portion 3.2 has a lower part that includes a slanting portion slanted toward a center axis of the upper cushion block 3 and a vertical bottom portion with an outer surface, and the outer surface of the vertical bottom portion is provided with an arc-shaped reinforcing rib 3.4, the extension portion 3.2 has a bottom and two blocking portions 3.3 protrude from left side and right side of the bottom of the extension portion 3.2, the distance a of two blocking portions on the same extension portion is greater than the distance b defined by the left surface and the right surface of the main through hole 1.2, the lower sections 1.33 of the two guiding grooves 1.3 on either the left surface or the right surface of the main through hole 1.2 define a first distance d that is greater than a second distance c defined by two blocking portions 3.3 on the two extension portions, the upper cushion block 3, the extension portions 3.2, the reinforcing rib 3.4 and the blocking portion 3.3 are integrated, correspondingly, a first port 2.2 is formed at a front side of the lower cushion block 2 and a second port is formed at a rear side of the lower cushion block 2, thereby facilitating to limit the lower cushion block 2, each of the first port and the second port receives one extension portion 3.2, the two blocking portions 3.3 of the extension portions engage the two guiding grooves 1.3 on each of the left surface and the right surface of the main through hole 1.2, the extension portions 3.2 extend elastically when the blocking portions 3.3 slide downwardly through the guiding grooves 1.3, and the blocking portions 3.3 are blocked by the bottom surface of the main body 1, each guiding groove 1.3 includes an upper section 1.31 with a first width, a lower section 1.33 with a second width, and a transition section 1.32 with a guiding surface arranged between the upper section 1.31 and the lower section 1.33, the first width is greater than the second width, in the embodiment, the guiding grooves 1.3 are arranged in V-shaped, that is, the lower sections 1.33 of the two guiding grooves 1.3 on either the left surface or the right surface of the main through hole 1.2 define a first distance that is smaller than a second distance defined by two blocking portions 3.3 on the two extension portions, and the effect is similar.

Finally, the adjusting groove of the main body 1 has a bottom surface and the lower cushion block 2 has a bottom surface, and both the bottom surface of the adjusting groove and the bottom surface of the lower cushion block are provided with tooth-surface for engaging each other.

The working principle of the die pressing plate as provided by the present invention is as follows.

The upper cushion block 3 is put on top of the lower cushion block 2 with the lower curve surface of the upper cushion block 3 engaging the top curve surface of the lower cushion block 2, the upper cushion block 3 and the lower cushion block 2 are disposed in the adjusting groove 1.1. The upper cushion block 3 is limited inside the first and the second port 2.2 of the lower cushion block 2 being able to swing from side to side. During the assembly of the upper cushion block 3, the blocking portions 3.3 slides downward in the guiding grooves 1.3. When the blocking portions 3.3 passes the transition section 1.32 and the lower section 1.33 of the guiding grooves 1.3, the blocking portions 3.3 is compressed by the guiding grooves 1.3, and the extension portion 3.2 firstly makes elastic deformation outwardly, after the blocking portions 3.3 passes through the whole guiding grooves 1.3, the extension portion 3.2 and the blocking portions 3.3 then naturally rebounds due to the loss of compression of the guiding grooves 1.3. Therefore, the blocking portions 3.3 are limited under the bottom surface of the clamping plate main body 1

(taking the extension portion 3.2 on the front of the upper cushion block 3 as an example). As a result, a fast and convenient connection among the upper cushion block 3, the lower cushion block 2 and the main body 1 is realized.

The invention claimed is:

1. A die pressing plate comprising:
a main body with a top surface and a bottom surface, an adjusting groove, and a main through hole formed in a center of the adjusting groove along a length of the main body, the main through hole having a left surface and a right surface, each of the left surface and the right surface has at least one guiding groove extending from the top surface to the bottom surface;
a lower cushion block having a top curve surface and a lower through hole defined by the top curve surface; and
an upper cushion block disposed on top of the lower cushion block, the upper cushion block having
a top surface and a lower curve surface for engaging the top curve surface of the lower cushion block,
an upper through hole defined on the top surface of the upper cushion block,
at least one extension portion protruding away from the lower curve surface, the at least one extension portion having two blocking portions extending horizontally away from the at least one extension portion and away from each other,
wherein the upper cushion block engaged with the lower cushion block is disposed in the adjusting groove,
the blocking portions of the at least one extension portion engage the at least one guiding groove on each of the left surface and the right surface of the main through hole, the at least one extension portion extends elastically when the blocking portion slides downwardly through the at least one guiding groove, and the blocking portion is blocked by the bottom surface of the main body.

2. The die pressing plate of claim 1, wherein there are two extension portions, protruding away from the lower curve surface of the upper cushion block, the two extension portions are located on opposite sides of the lower curve surface of the upper cushion block, and there are two guiding grooves on each of the left surface and the right surface of the main through hole.

3. The die pressing plate of claim 2, wherein each guiding groove includes an upper section with a first width, a lower section with a second width, and a transition section with a guiding surface arranged between the upper section and the lower section, the first width is greater than the second width,
the lower sections of the two guiding grooves on either the left surface or the right surface of the main through hole define a first distance that is greater than or smaller than a second distance defined by two blocking portions on the two extension portions.

4. The die pressing plate of claim 3, wherein the two guiding grooves on either the left surface or the right surface of the main through hole are substantially arranged in inverted-V-shaped or V-shaped.

5. The die pressing plate of claim 1, wherein the at least one extension portion has a bottom and two blocking portions protrude from left side and right side of the bottom of the at least one extension portion.

6. The die pressing plate of claim 1, wherein the at least one extension portion has a middle part with an inner side and a recess is formed therein, the recess causes the at least one extension portion to have a small thickness in the middle part, a first port is formed at a front side of the lower cushion block and a second port is formed at a rear side of the lower cushion block, each of the first port and the second port receives one extension portion.

7. The die pressing plate of claim 1, wherein the at least one extension portion has a lower part that includes a slanting portion slanted toward a center axis of the upper cushion block and a vertical bottom portion with an outer surface, and the outer surface of the vertical bottom portion is provided with an arc-shaped reinforcing rib.

8. The die pressing plate of claim 1, wherein the adjusting groove has a bottom surface and the lower cushion block has a bottom surface, and both the bottom surface of the adjusting groove and the bottom surface of the lower cushion block are provided with tooth-surface for engaging each other.

* * * * *